(12) United States Patent
Fouquet

(10) Patent No.: US 6,272,515 B1
(45) Date of Patent: *Aug. 7, 2001

(54) METHOD OF SCHEDULING DISTRIBUTED TRANSACTIONS

(75) Inventor: Guy Fouquet, Paris (FR)

(73) Assignee: Alstom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,062

(22) Filed: Jul. 10, 1997

(30) Foreign Application Priority Data

Jul. 11, 1996 (FR) .................................................. 96 08673

(51) Int. Cl.⁷ ........................................................ G06F 9/00
(52) U.S. Cl. ............................................................ 709/101
(58) Field of Search .................................. 709/100, 101, 709/103, 102

(56) References Cited

U.S. PATENT DOCUMENTS 5,377,352 * 12/1994 Tanaka et al. ....................... 395/650
5,504,900 * 4/1996 Raz ...................................... 395/650
5,530,851 * 6/1996 Fortier ................................. 395/600

FOREIGN PATENT DOCUMENTS 2256514    12/1992 (GB) .

OTHER PUBLICATIONS

Georgakopoulos et al. "Chronological Scheduling of Transactions with Temporal Dependencies", 1993.*

Orji et al. "A Performance Analysis of an Optimistic and A Basic Timestamp–Ordering Concurrency Control Algorithms for Centralized Database systems", Feb. 1988.*

Aybay et al. "EE442 Operating Systems Lecture Notes", 1992.*

(Coulouris, et al) Coulouris, George et al. "Distributed Systems Concepts and Design" Second Edition. Ch. 13, p. 377–404, May 1994.*

Yi Lin et al, "Concurrency Control in Real–Time Databases by Dynamic Adjustment of Serialization Order", Proceedings of the Real Time Shystems Symposium, Lake Buena Vista, Dec. 5–7, 1990, No. Symp. 11, Dec. 5, 1990, Institute of Electrical and Electronics Engineers, pp. 104–112, XP000214341.

IBM Technical Disclosure Bulletin, vol. 37, No. 8, Aug. 1, 1994, pp. 609–614, XP000456543, "Method for Performance Enhancement in the Parallel Execution of Static Database Transactions".

* cited by examiner

Primary Examiner—Alvin E. Oberley
Assistant Examiner—Lewis A. Bullock, Jr.
(74) Attorney, Agent, or Firm—Sughrue, Mion, Zinn, Macpeak & Seas, PLLC

(57) ABSTRACT

A method of scheduling distributed transactions, on each initiation of a current transaction, identifies, among older transactions in process of execution, operations activated or waiting to be activated of the transactions that conflict with a particular operation of the current transaction. For each particular operation of the current transaction for which a particular number of conflicting operations have been identified, the method associates with the particular operation a counter the value of which is indicative of the number of operations conflicting with the particular operation. It decrements the value of the counter as and when operations conflicting with the particular operation terminate so as to activate the particular operation only when its counter indicates that there are no longer any operations conflicting with it.

2 Claims, 2 Drawing Sheets

METHOD OF SCHEDULING DISTRIBUTED TRANSACTIONS

BACKGROUND OF THE INVENTION

1. Field of the invention

The invention concerns a method of scheduling distributed transactions for a transactional monitor.

2. Description of the prior art

A distributed transaction is a partially ordered set of operations to be executed remotely and distributed between a number of processes. These operations can be instantiated methods in objects potentially replicated in more than one process.

A transactional monitor serializes the activation (or invocation) of the operations of the transactions in conformance with the chronological order in which the transactions are initiated.

At the level of the monitor, each transaction is initiated on the reception of an event. During the execution of a transaction the termination of a given operation leads to the reception of an event enabling activation of a subsequent operation of the transaction.

In industrial control/command applications there is a need to maintain a coherent image of the monitored process so that its behavior can be controlled. Data reflecting the image of the process is managed by means of an application and interaction between the application and the process is assured by events sent and received by sensors distributed across the process. The process being of a distributed nature, the application uses distributed transactions to maintain a coherent image of the process in a database. These industrial control/command applications run in flexible real time and it is therefore important to initiate several transactions in parallel, but this possibility of parallel initiation of transactions causes a problem at the level of operation activation scheduling. The transactions include identical or analogous operations, known as conflicting operations, since they cannot be executed at the same time because they interact with the same data.

The aim of the invention is to propose a method of scheduling distributed transactions for a transactional monitor with the possibility of parallel initiation of transactions in order to serialize activation of the operations of the transactions in accordance with the chronological order in which the transactions are initiated and allowing for conflicts of execution between operations of different transactions or of the same transaction.

Another aim of the invention is to propose a scheduling method of this kind that is suitable for complex transactions including recovery sequences if necessary.

SUMMARY OF THE INVENTION

To this end, the scheduling method of the invention comprises the steps of:

on each initiation of a current transaction, identifying, among older transactions in process of execution, operations activated or waiting to be activated of the transactions that conflict with a particular operation of the current transaction, and for each particular operation of the current transaction for which a particular number of conflicting operations have been identified, associating with the particular operation a counter the value of which is indicative of the number of operations conflicting with the particular operation and decrementing the value of the counter as and when operations conflicting with the particular operation terminate so as to activate the particular operation only when the counter of the particular operation indicates that there are no longer any operations conflicting with the latter.

One embodiment of the invention is described in more detail hereinafter with reference to the drawings.

DETAILED DESCRIPTION OF THE PREFERRED EMBODIMENT

The scheduling method of the invention is suitable for transactions with operations that can be activated in sequence, in parallel, chosen via a conditional expression or iterated in a loop.

Figure 1:
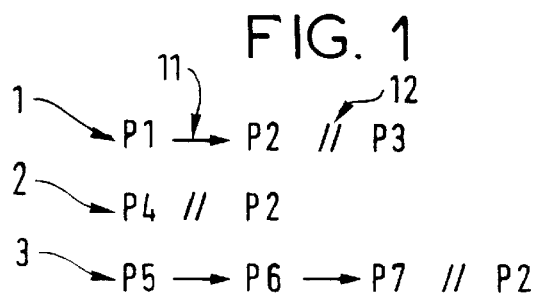
FIG. 1 shows examples of expressions of distributed transactions.

In FIG. 1, the three transaction expressions 1, 2 and 3 are relatively simple. They use a sequential operation chaining operator 11 and a parallel operation chaining operator 12. Each transaction expression defines a particular chronological order in which the operations of the transaction concerned must be chained.

Thus, for transaction 1, activation of operation P2 is chained after termination of operation P1 (sequential activation) whereas activation of operation P3 can be chained after activation of operation P2 without waiting for P2 to terminate, i.e. in parallel with operation P2.

For transaction 2, activation of operation P2 is chained after activation of operation P4 without waiting for P4 to terminate.

For transaction 3, activation of operation P6 is chained after termination of operation P5, activation of operation P7 is chained after termination of operation P6 and activation of operation P2 is chained after activation of operation P7 without waiting for P7 to terminate.

Note that the transaction expressions from FIG. 1 are structured as regular expressions with operators having a greater or lesser priority relative to others.

Figure 2:
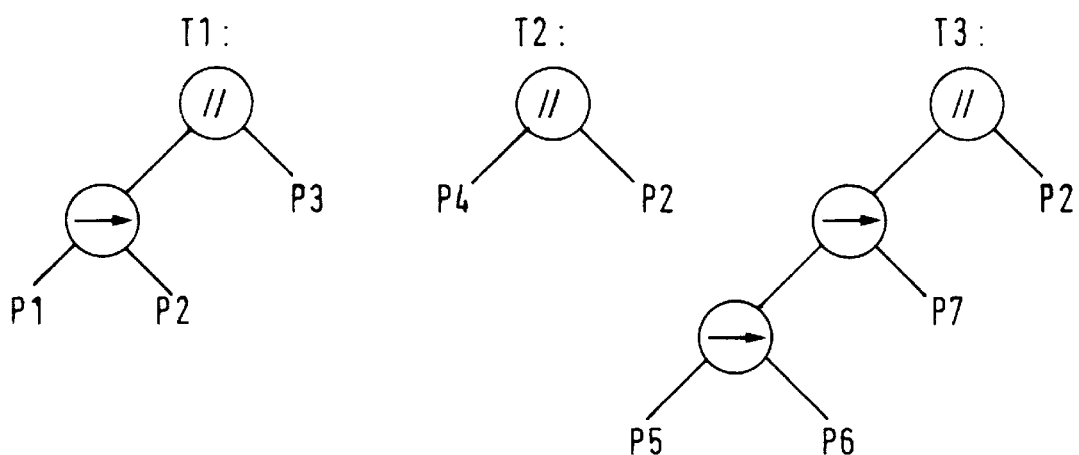
FIG. 2 is a graphical representation of the expressions of the transactions from FIG. 1.

In FIG. 2 the expressions 1, 2 and 3 of the transactions T1, T2, T3 from FIG. 1 are shown in the form of directed graphs with leaves corresponding to operations and nodes corresponding to the operation chaining operators. These graphs are conventionally implemented in memory in the form of chained lists which define the chronological order in which the operations of each transaction must be activated.

The three transactions T1, T2 and T3 shown in FIG. 2 have a common operation, operation P2. If these three transactions can be initiated in parallel, it can be seen that there is a possibility of conflict in respect of operation P2. To comply with the causal order of initiation of the transactions, assuming T3 is initiated after T2 and T2 is initiated after T1, operation P2 of T3 must be activated only after operation P2 of T2 terminates. Likewise, operation P2 of T2 must be activated only after operation P2 of T1 terminates.

Operations P2 of T1, P2 of T2 and P2 of T3 are conflicting operations. The scheduling method of the invention provides a simple way of preventing parallel activation of these conflicting operations.

Figure 3:
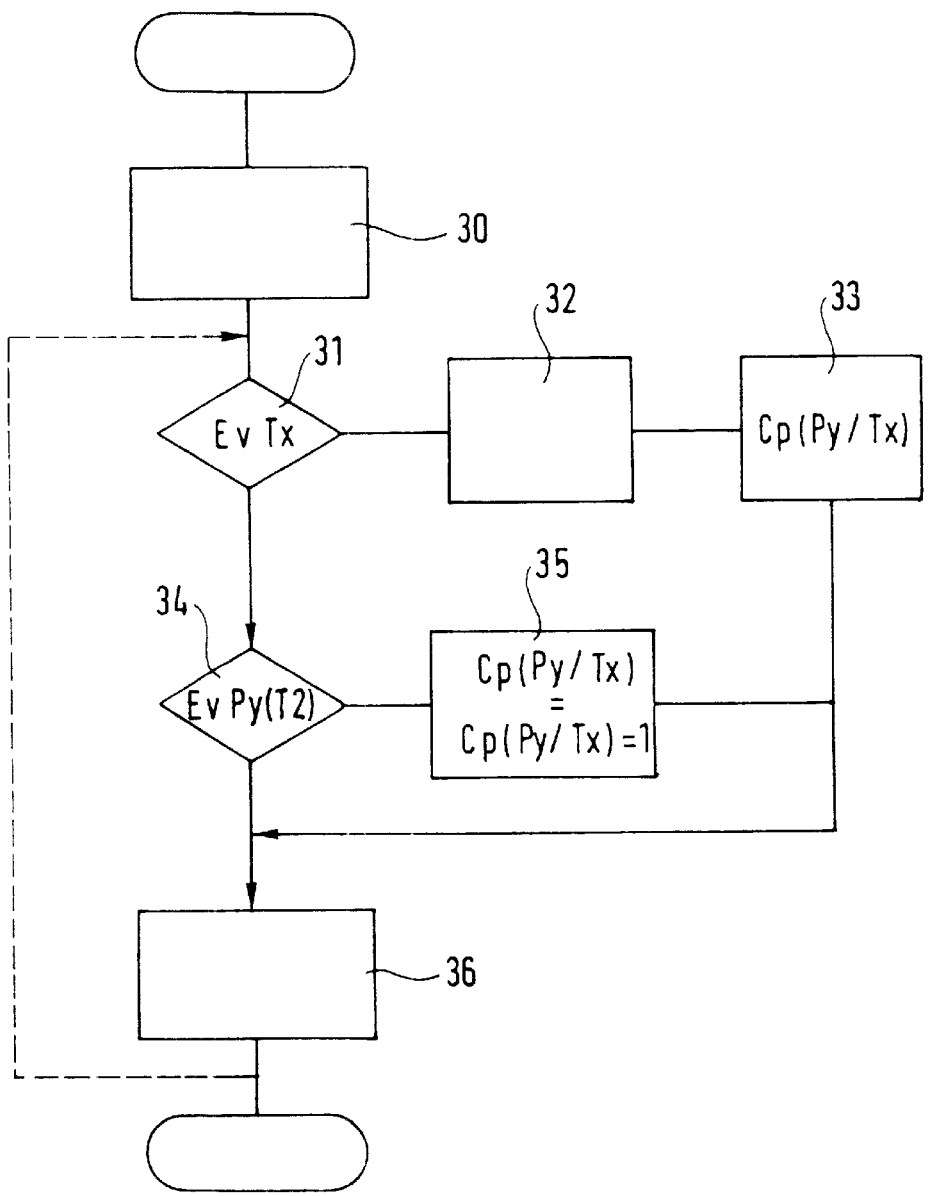
FIG. 3 is a flowchart showing the main steps of the scheduling method of the invention.

In FIG. 3, in the scheduling method of the invention, the transaction expressions, advantageously structured in the form of regular expressions, are entered into memory in the transactional monitor and are treated, by syntactical and semantic analysis, to be implemented in the form of chained lists (block 30) each of which indicates the order in which the operations of each transaction must be activated.

Each transaction entered in the transactional monitor is scheduled after an event is received indicating the initiation of the transaction (event EvTx in block 31). This transaction is referred to as the current transaction Tx, as opposed to transactions already initiated and in process of execution.

Scheduling the current transaction Tx consists firstly in identifying (block 32), in operations activated or waiting to be activated of older transactions already initiated and in process of execution, any operations that conflict with one or more particular operations of the current transaction. This identification can be based on a look-up table listing conflicting transactions and previously entered into the transactional monitor and updated as and when these conflicting operations terminate to indicate which are the conflicting operations in process of execution or waiting to be activated.

Then, a counter Cp(PyTx) is associated (block 33) with each particular operation (Py) of the current transaction Tx for which a particular number of conflicting operations has been identified and the value of the counter associated with a particular operation (block 33) is set to indicate the number of operations conflicting with the latter.

When the scheduling of the transaction Tx is terminated, this current transaction is executed (block 36), i.e. the activations of operations of the current transaction are chained in the order given by the expression of the transaction. Nevertheless, activation of a particular operation of the current transaction will be delayed as long as the counter associated with that particular operation indicates that there are still operations conflicting with the latter.

The value of the counter associated with this particular operation is decremented (block 35) as and when operations conflicting with the latter terminate (i.e. during the execution of older transactions), reported to the transactional monitor by the reception of an event EvPy(Tz) (block 34), until there are no more conflicting operations. When there are no more operations conflicting with the particular operation, the particular operation can be activated.

Figure 4:
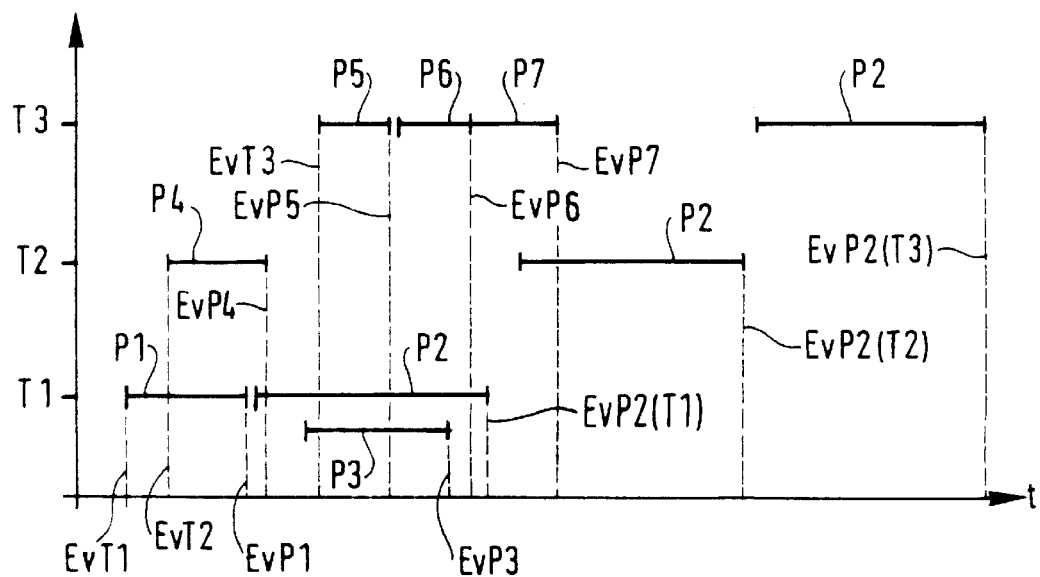
FIG. 4 shows one example of the chaining of activation of operations of the transactions from FIG. 1 using the scheduling method of the invention.

FIG. 4 shows in a highly schematic manner one example of chaining of operation activation for transactions T1, T2, T3.

In this figure, transaction T1 is initiated first after reception of a initiation event EvT1. When this current transaction is initiated, there is no older transaction in process of execution and consequently the counters associated with the respective operations T1 indicate that there are no conflicting operations. Transaction T1 is executed and operation P1 is activated first.

Transaction T2 is initiated subsequently following reception of event EvT2. Transaction T2 is then scheduled allowing for the conflicting operations of T1. Operation P2 of T2 conflicts with operation P2 of T1 waiting to be activated. Consequently, the value of the counter associated with operation P2 of T2 is set to 1 to indicate that there is a conflicting operation (Cp(P2/T2)=1). Transaction T2 is executed and operation P4 is activated.

Following termination of operation P1 (indicated by reception of event EvP1), operation P2 of T1 is activated. Operation P4 has now terminated (reception of EvP4) but activation of operation P2 of T2 is delayed because the value of the counter associated with operation P2 of T2 indicates that there is a conflicting operation (Cp(T2/T2)=1).

Operation P3 of T1 is now activated in parallel with operation P2 of T1.

Transaction T3 is initiated next, following reception of event EvT3. Transaction T3 is then scheduled and for operation P2 of T3 there are two conflicting operations activated or waiting to be activated, respectively operation P2 of T1 and operation P2 of T2. The value of the counter associated with operation P2 of T3 is set to 2 (Cp(P2/T3)=2).

Transaction T3 is now executed and operation P5 is activated. Following termination of operation P5 (reception of EvP5), operation P6 is activated. Operation P3 is now terminated (reception of EvP3) and operation P7 is activated after termination of operation P6 (reception of EvP6).

Now, following termination of operation P2 of T1, indicated by reception of event EvP2 (T1), the value of the respective counters associated with operation P2 of T2 and operation P2 of T3 is decremented (Cp(P2/T2)=0 and Cp(P2/T3)=1). Operation P2 of T2 can now be activated.

Now, operation P7 is terminated (reception of EvP7) and after termination of operation P2 of T2, indicated by reception of event EvP2(T2), the value of the counter associated with operation P2 of T3 is decremented (Cp(P2/T3)=0). Operation P2 of T3 can now be activated. Event EvP2(T3) is finally received and execution of the transactions is terminated.

Figure 5:
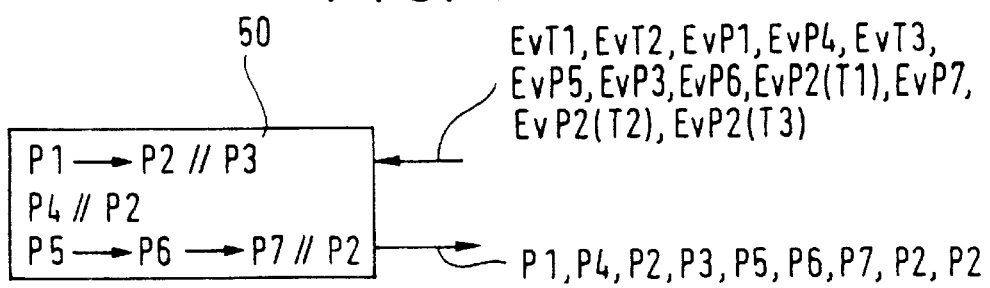
FIG. 5 shows the serialization of activation of operations at the output of the transactional monitor for the operation chaining example from FIG. 4.

In FIG. 5, the transactional monitor 50 serializes transactions T1, T2, T3 to produce the following sequence of operation activations: P1-P4-P2-P3-P5-P6-P7-P2-P2, complying with the order of arrival of the transaction initiation events, the order of chaining of the operations within each transaction and the order of arrival of the operation termination events which are, in this example:
EvT1, EvT2, EvP1, EvP4, EvT3, EvP5, EvP3, EvP6, EvP2 (T1), EvP7, EvP2(T2), EvP2(T3).

The method in accordance with the invention of scheduling distributed transactions is also suitable for management of transactions including recovery sequences. A recovery sequence in a transaction corresponds to a branch of the transaction graph that is executed on reception of a particular event, known as an exception event, following a problem with executing an operation of that transaction. A transaction recovery sequence can of course include a plurality of operations which are chained and which are substituted for certain other operations of the transaction. When an exception event of this kind is received by the transactional monitor for a transaction in process of execution, the recovery sequence of that transaction must be scheduled using the counter management principle to allow for possible conflicts between operations of the recovery sequence and operations of other transactions in process of execution.

There is claimed:

1. A method of scheduling distributed transactions for a transactional monitor including parallel execution of said transactions in order to serialize activation of operations of said transactions in accordance with a chronological order of initiation of said transactions, said method including the steps of:

on each initiation of a current transaction, identifying, among older transactions in process of execution, operations activated or waiting to be activated of said older transactions that conflict with a particular operation of said current transaction, and for each particular operation of said current transaction for which a particular number of operations conflicting with said current operation have been identified, associating with said particular operation a counter the value of which is indicative of the number of said operations conflicting with said particular operation and decrementing the value of said counter as and when said operations conflicting with said particular operation terminate so as to activate said particular operation only when said counter of said particular operation indicates that there are no longer any operations conflicting with said particular operation so that conflicting operations of said transactions are activated in accordance with the chronological order in which said transactions are initiated.

2. A method of scheduling distributed transactions for a transactional monitor including parallel execution of said transactions in order to serialize activation of operations of said transactions in accordance with a chronological order of initiation of said transactions, said method including the steps of:

on each initiation of a current transaction, identifying among older transactions in process of execution, operations activated or waiting to be activated of said older transactions that conflict with a particular operation of said current transaction, and for each particular operation of said current transaction for which a particular number of operations conflicting with said current operation have been identified, associating with said particular operation a counter the value of which is indicative of the number of said operations conflicting with said particular operation and decrementing the value of said counter as and when one of said operations conflicting with said particular operation terminate so as to activate said particular operation only when said counter of said particular operation indicates that there are no longer any operations conflicting with said particular operation so that conflicting operations of said transactions are activated in accordance with the chronological order in which said transactions are initiated;

wherein each of said transactions includes a predetermined set of operations and a predetermined combination of sequential and parallel chaining operators effective to activate respective operations and defining a particular chronological order in which the operations of each of said transactions are chained.

* * * * *